Patented Dec. 13, 1927.

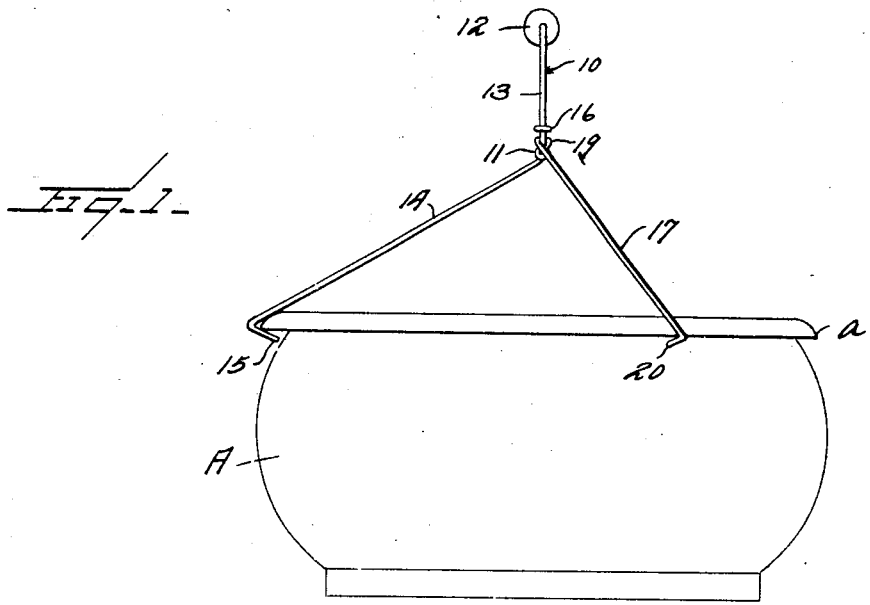
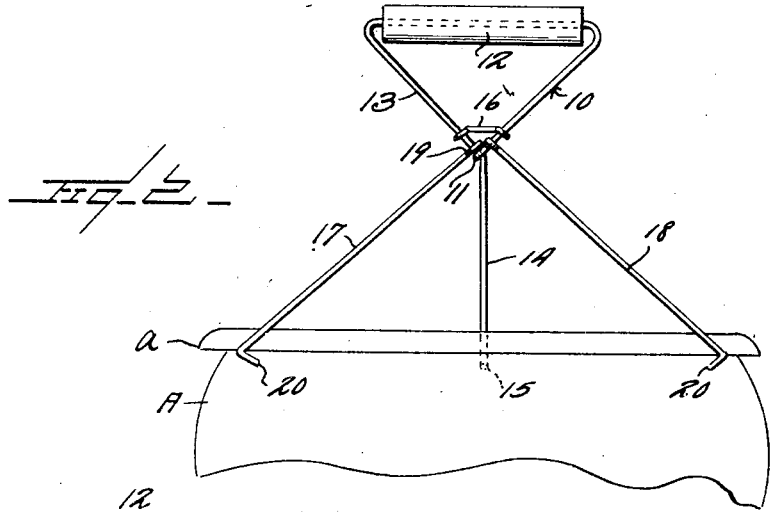
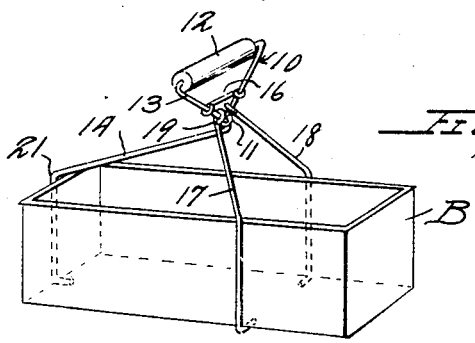

1,652,837

UNITED STATES PATENT OFFICE.

OLIVER E. RANDALL, OF UNION VILLAGE, VERMONT.

CARRIER FOR MILK AND CREAM SEPARATORS.

Application filed January 22, 1927. Serial No. 162,834.

This invention relates to carriers for the separator tanks of cream separators and the general object of the present invention is to provide a very convenient and simple carrier which will engage with the rim or flange of the separator tank so that this tank and its contents may be carried with one hand while the other hand can be used to carry milk utensils.

A further object is to provide a carrier so constructed that it is capable of being adjusted to tanks of different diameters.

My invention is illustrated in the accompanying drawings wherein:—

Figure 1 is a perspective view showing my tank lifting implement;

Fig. 2 is a perspective view looking at the front thereof;

Fig. 3 is a perspective view showing a slightly modified form of the device.

Referring to these drawings it will be seen that the carrier, as illustrated in Figure 2, consists of a handle yoke 10 formed of wire. This wire is bent to form an eye 11 at one end, then extends upward and laterally, is bent to extend through a sleeve-like handle 12, and is then bent downward, as at 13, to pass through said eye 11. After the wire or rod passes through the eye 11 it is angularly bent so as to form a shank 14 terminating in a hook 15. The portions 10 and 13 of the handle yoke are engaged with each other and braced in proper triangular relation by means of the wire brace 16 bent to form eyes at its ends embracing the portions 10 and 13. Swingingly mounted upon the handle yoke between the brace 16 and the eye 11 and disposed one on each side of the eye 11, are the shanks 17 and 18, each formed with an eye 19 at its upper end through which the wire of the handle yoke passes and each is formed with a hook 20 at its lower end. It will be seen that the three shanks 14, 17 and 18 are capable of being shifted into divergent relation with the hooks extended inward and that when in this position they will grasp or engage over the rim of a separator tank A with the handle centered with relation to the tank so that the tank may be readily carried. When the carrier is removed from the tank, the three shanks will swing together so that the carrier is in compact form and may be placed inside the separator tank or hung up in a convenient position for use. Inasmuch as the three shanks 14, 17 and 18 are free to move radially outward or inward it follows that this implement may be used with separator tanks differing in diameter. Inasmuch as one of the shanks, the shank 14, is rigidly connected to the handle yoke, this shank may be readily engaged with the rim $a$ by the hand holding the handle and then the other shanks may be connected or the other shanks may be swung outward and engaged with the rim and then the shank 14 engaged with the rim so that the implement may be manipulated and placed upon the separator tank with one hand which is of great advantage when the other hand is carrying utensils.

In Figure 3 I illustrate a slightly modified form of this device which is adapted to be used with a rectangular separator tank. In this case the three shanks do not extend straight downward and outward but are slightly curved or bent at 21, so as to extend down over a straight side of the separator tank B. One of the shanks as, for instance, the shank 14 is made longer than the other shanks so that it may extend down over the end of the shank B with the handle disposed approximately above the middle of the shank. Otherwise than this the carrier shown in Figure 3 is constructed in the same manner as that shown in Figure 2.

I claim:—

1. A tank carrier comprising a handle yoke and a handle connected thereto, the handle yoke being extended to form a shank rigid with the handle yoke and hooked at its extremity, and a plurality of independent shanks each swingingly connected to the handle yoke and each hooked at its extremity.

2. A tank carrier comprising an approximately triangular transversely extending handle yoke having a handle, one side of the triangular yoke being extended beyond the other side to form a shank having an inwardly turned hook at its extremity, and a pair of independent shanks each swingingly mounted for free movement upon the lower end of the handle yoke and each having an inwardly turned hook at its extremity.

3. A carrier for tanks comprising a handle yoke formed of a length of wire bent to form a triangle, the wire being formed to provide an eye at the apex of the triangle and the wire of the other side of the triangle passing through said eye and constituting a shank and formed with an inwardly turned hook at its extremity, a brace engaging the two sides of the triangle above the eye, and a pair of shanks having eyes at their upper ends and loosely connected with the wire of the handle yoke on each side of said eye therein, the lower ends of the shanks having inwardly extended hooks.

In testimony whereof I hereunto affix my signature.

OLIVER E. RANDALL.